UNITED STATES PATENT OFFICE.

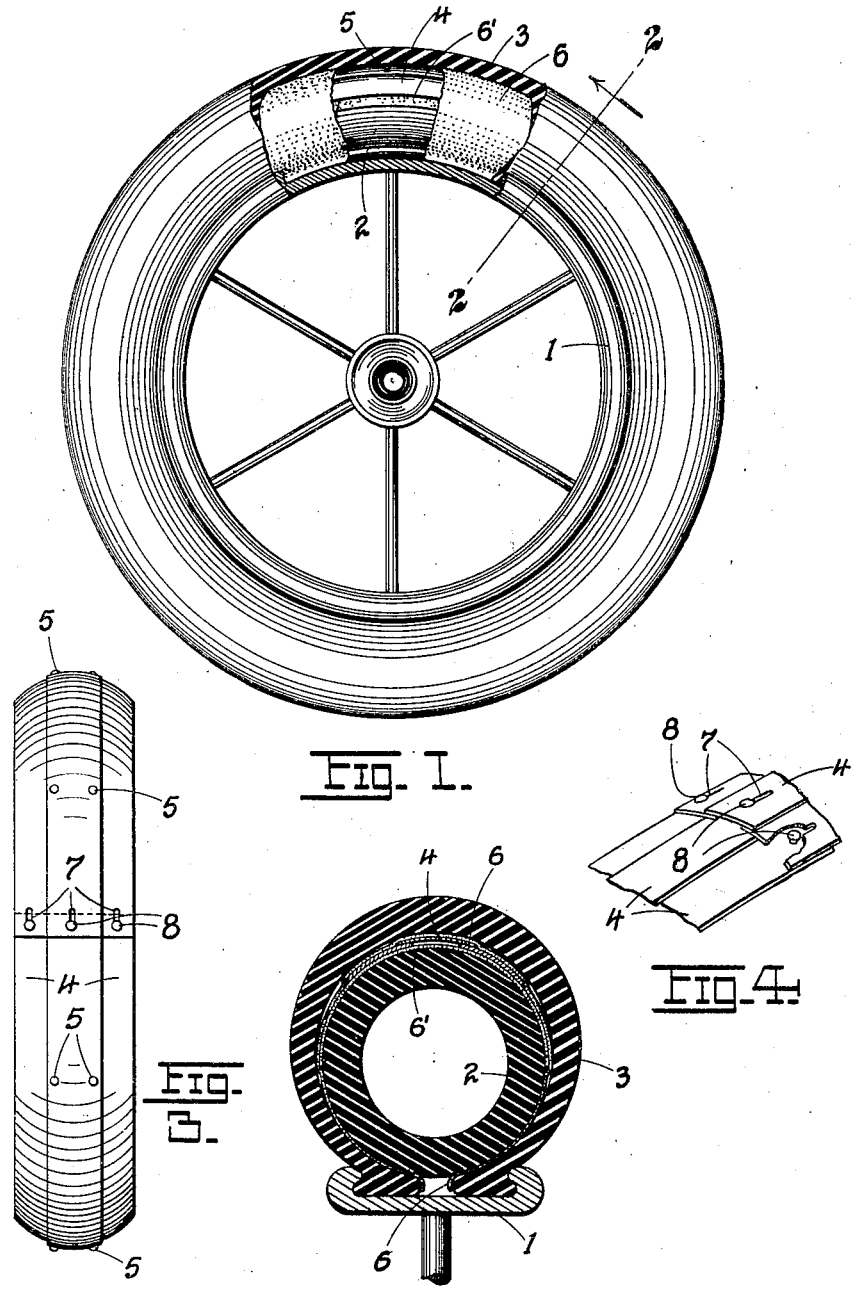

LORWIN N. CATES, OF ST. LOUIS, MISSOURI.

PNEUMATIC TIRE.

No. 849,049.

Specification of Letters Patent.

Patented April 2, 1907.

Application filed March 23, 1906. Serial No. 308,590.

*To all whom it may concern:*

Be it known that I, LORWIN N. CATES, a citizen of the United States, residing at St. Louis, State of Missouri, have invented certain new and useful Improvements in Pneumatic Tires, of which the following is a full, clear, and exact description, reference being had to the accompanying drawings, forming a part hereof.

My invention has relation to improvements in pneumatic tires; and it consists in the novel construction of tire more fully set forth in the specification and pointed out in the claim.

In the drawings, Figure 1 is an elevation of a vehicle-wheel, showing my invention applied thereto with walls partly broken away. Fig. 2 is a cross-section on the line 2 2 of Fig. 1. Fig. 3 is an elevation of the intermediate metal puncture-proof band, and Fig. 4 is a perspective detail showing the overlapping ends of the strips comprising the metal band.

The present invention is an improvement on the construction of tire forming the subject-matter of my pending application, Serial No. 303,838, filed March 2, 1906, and while contemplating the several objects therein referred to the present device is qualified so as to present a simpler construction and at the same time afford means for more effectively retaining in position the metal puncture-proof section, the latter being in the present instance made, so as to adjust itself to the variable expansion of the pneumatic portion. In detail the invention may be described as follows:

Referring to the drawings, 1 represents the rim of an ordinary wheel equipped with a pneumatic tire, the latter being composed of the usual inner inflatable tube or section 2 and of the outer layer or section 3. Interposed between the aforesaid sections is a metallic layer of thin steel, said intermediate layer comprising a number of metal strips 4 4, overlapping along their longitudinal edges and loosely riveted at predetermined points, the heads of the rivets 5 being expanded and flattened to reduce the projections as much as possible, and thereby secure a smooth surface for the metal layer. This metal layer is of course puncture-proof and is preferably incased in a sheath of canvas and rubber, the sheath being made of two layers of material cemented together, the outer wall or layer 6 being extended beyond the lines of juncture with the inner layer 6' a sufficient distance to well envelop the inner tube 2, the edges of the enveloping folds being drawn toward each other by the outer section 3 in the assembling of the parts.

In order to permit the metal layer to conform and readily yield to the variable expansion of the pneumatic portions of the tire under the tension exerted by the air confined within the inner tube, the ends of the several strips are provided with elongated slots 7, which are loosely engaged by rivets or studs 8. The length of the slots 7 is sufficient of course to allow for the maximum degree of expansion to which the tire is subjected, the studs 8 freely playing in the slots with any movement of the tire.

The manner of assembling and uniting the several strips as described affects, in a measure, a sort of hinged connection between them, permitting the several strips as a unit to be bent into a circular band adapted to envelop the inner inflatable section 2 of the tire. Each strip has a curved cross-section, imparting to the composite band formed by them collectively a cross-sectional curvature substantially conforming to the curvature of that portion of the section 2 encompassed by it. The several strips, coupled together as they are, assume a circular form without binding, conforming collectively to the general convexity of the inner section 2.

Having described my invention, what I claim is—

A pneumatic tire comprising an inner inflatable tube or section, an outer layer or section therefor, an intermediate band composed of a series of overlapping strips, a series of headed rivets yieldingly and mechanically connecting the strips along their overlapping portions or edges, the several strips terminating at one end in elongated slots, and having studs at the opposite end for loosely engaging said slots, the band encompassing the outer portion of the periphery of the inner tube, substantially as set forth.

In testimony whereof I affix my signature in presence of two witnesses.

LORWIN N. CATES.

Witnesses:
EMIL STAREK,
MARY D. WHITCOMB.